United States Patent [19]

Kotlarewsky

[11] 4,174,534
[45] Nov. 13, 1979

[54] MASTER-SLAVE VOLTAGE REGULATOR EMPLOYING PULSE WIDTH MODULATION

[75] Inventor: Paul Kotlarewsky, Ottawa, Canada

[73] Assignee: Northern Telecom Limited, Montreal, Canada

[21] Appl. No.: 871,105

[22] Filed: Jan. 20, 1978

[51] Int. Cl.² .......................................... H02M 3/335
[52] U.S. Cl. ........................................ 363/26; 363/72
[58] Field of Search ..................... 363/26, 41, 71, 72, 363/96, 97, 65, 67

[56] References Cited

U.S. PATENT DOCUMENTS

| | | | |
|---|---|---|---|
| 2,990,517 | 6/1961 | Grieg | 363/72 X |
| 3,205,424 | 9/1965 | Bates | 363/72 X |
| 3,253,228 | 5/1966 | Montner | 363/41 X |
| 3,439,242 | 4/1969 | Gasser | 363/72 X |
| 3,458,797 | 7/1969 | Larsen | 363/72 X |
| 3,559,030 | 1/1971 | Bussard | 363/26 |
| 3,623,140 | 11/1971 | Nercessian | 323/23 |
| 3,970,916 | 7/1976 | Kienscherf | 363/41 X |
| 4,005,352 | 1/1977 | Kugler et al. | 363/26 |
| 4,039,925 | 8/1977 | Fletcher et al. | 363/70 |

Primary Examiner—J. D. Miller
Assistant Examiner—Peter S. Wong
Attorney, Agent, or Firm—Robert C. Hogeboom

[57] ABSTRACT

A pulse width modulation (PWM) converter circuit for transforming a first DC voltage into a secondvoltage (AC or DC), wherein the magnitude of the second voltage is regulated by the converter circuit. The converter circuit comprises a clock circuit, a master pulse width modulator (PWM) circuit and n slave pulse width modulator (PWM) circuits. The clock circuit provides a symmetrical train of rectangular pulses on each of n+1 conductors, wherein only one pulse occurs on any one of the conductors at one time. The master PWM means is responsive both to the train of pulses on one of the n+1 conductors and to a feedback signal indicative of the magnitude of the second voltage; the master PWM means controls the flow of current, due to the first DC voltage, through a portion of a transformer primary winding. Each of the slave PWM circuits is responsive both to the train of pulses on n of the n+1 conductors, in a one-to-one relationship, and to an output control signal based both upon the feedback signal, indicative of the magnitude of the second voltage, and upon the difference in the magnitude of the charge passed by the master PWM circuit and the charge passed by the respective slave PWM circuits; each of the slave PWM circuits controls the flow of current, due to the first DC voltage, through a portion of the transformer primary winding.

15 Claims, 3 Drawing Figures

MASTER-SLAVE VOLTAGE REGULATOR EMPLOYING PULSE WIDTH MODULATION

This invention relates generally to DC power supplies, and more particularly to a DC to DC voltage converter employing Pulse Width Modulation (PWM) regulation, for producing a regulated output voltage (AC or DC) from a first input DC voltage.

BACKGROUND OF THE INVENTION

The principle of PWM regulation is well known in the art. PWM regulators operate on the basic principle that the incoming DC voltage, which is to be regulated, is chopped or pulsed by means of switched devices (e.g. transistors). The rectangular pulses thus obtained are applied, via a transformer, to a rectifier circuit (including a smoothing filter) for producing the desired regulated DC output voltage. By converting the input voltage into a train of pulses, the magnitude of the rectified output voltage can be regulated by varying the width of the pulses while maintaining the frequency of the pulses constant. Automatic control of such a system is accomplished by monitoring the magnitude of the DC output voltage and by providing suitable circuitry to vary the width of the pulses, as required, in order to maintain the magnitude of the DC output voltage at the required level.

Examples of prior art devices include those depicted in the following U.S. patents, and attention is directed to them:

U.S. Pat. Nos. 3,670,234 dated June 13, 1972 to James M. Joyce;
3,789,288 dated Jan. 29, 1974 to B. H. Assow, et al;
3,806,791 dated Apr. 23, 1974 to Leo J. Johnson;
3,870,943 dated Mar. 11, 1975 to H. R. Weischedel, et al; and
3,988,661 dated Oct. 26, 1976 to Daniel J. McCoy.

One problem existing in prior art circuits employing PWM regulators is that of maintaining current balance between the alternately switched devices (e.g., transistors) which convert the DC input voltage into a train of pulses. These switched devices form the inverter portion of the power supply, and for optimum performance from the circuit, the power handled by each such switched device should be equal to the power handled by any other switched device in the circuit.

Another problem in prior art circuits occurs when multiple power supplies are connected in parallel to supply higher power to a common load. Prior art circuits, for power sharing between several power supplies, have been complex and cumbersome.

SUMMARY OF THE INVENTION

The present invention, while based upon the known principles of PWM regulation, employs a novel master-slave type of arrangement for controlling the width of the pulses produced by the inverter portion of the circuit. This master-slave type of arrangement allows for several slave units to be employed with a single master unit, and it also allows for two or more power supplies to be paralleled, while ensuring current sharing between power supplies. The master unit and the slave unit are identical in construction; they acquire their distinctiveness (i.e., master or slave) depending upon how they are wired into the circuit.

In accordance with one embodiment of the present invention, a power supply (or DC to DC voltage converter) comprises one master unit and one slave unit. A clock circuit with one output line for the master unit and one output line for the slave unit is provided. The clock produces a train of rectangular pulses on each of its output lines, with only one pulse on one line at any given time, and all the pulses being of equal duration. The master unit comprises a transistor switch which is employed to interrupt the input DC voltage in response to a signal based upon the train of pulses the master unit receives from the clock, but modified by a control signal indicative of the regulated output voltage of the power supply. The slave unit comprises a transistor switch which is employed to interrupt the input DC voltage in response to a signal based upon the train of pulses the slave unit receives from the clock, but modified by a control signal indicative both of the regulated output voltage of the power supply and the difference in charge passed by the master and slave units. The current pulses, passed by the transistors of the master and slave units, pass through the primary winding of a transformer. The voltage induced in the secondary winding of this transformer is rectified and filtered, producing the required regulated output voltage.

In another embodiment, the present invention is a pulse width modulation converter circuit for transforming a first DC voltage into a second voltage, wherein the magnitude of the second voltage is regulated by the converter circuit, the converter circuit comprising:

a clock means for providing a symmetrical train of pulses on each of n+1 conductors, wherein only one pulse occurs on any one of the conductors at any given instant in time, and wherein n is a positive integer equal to, or greater than, 1;

a master pulse width modulator means responsive both to the train of pulses on one of the n+1 conductors and to a feedback signal indicative of the magnitude of the second voltage, the master pulse width modulator means controlling the flow of current, due to the first DC voltage, through a portion of a transformer primary winding;

n slave pulse width modulator means, each of the slave pulse width modulator means being responsive both to the train of pulses on one of the n+1 conductors, in a one-to-one relationship, and to an output control signal based both upon the feedback signal, indicative of the magnitude of the second voltage, and upon the difference in the magnitude of the charge passed by the master pulse width modulator means and the charge passed by the respective slave pulse width modulator means, each of the slave pulse width modulator means controlling the flow of current, due to the first DC voltage, through a portion of the transformer primary winding.

In yet another embodiment, the present invention is a pulse width modulation converter circuit for transforming a first DC voltage into a second voltage, wherein the magnitude of the second voltage is regulated by the converter circuit, the converter circuit comprising:

a clock means for providing a symmetrical train of rectangular pulses on each of n+1 conductors, wherein only one pulse occurs on any one of the conductors at any given instant in time, and wherein n is a positive integer equal to, or greater than, 1;

a master pulse width modulator means responsive both to the train of pulses on one of the n+1 conductors and to a feedback signal indicative of the magnitude of the second voltage, the master pulse width modulator means controlling the flow of current, due to the first DC voltage, through a portion of a transformer primary winding;

n slave pulse width modulator means, each of the slave pulse width modulator means being responsive both to the train of pulses on one of the n+1 conductors, in a one-to-one relationship, and to an output control signal, the output control signal being based both upon the feedback signal indicative of the magnitude of the charge passed by the master pulse width modulator means and the charge passed by the respective slave pulse width modulator means, each of the slave pulse width modulator means controlling the flow of current, due to the first DC voltage, through a separate and distinct portion of the transformer primary winding;

a rectifier means connected to the secondary winding of the transformer for rectifying the resultant voltage appearing across the secondary winding, thereby producing the second voltage;

a control circuitry means for monitoring the second voltage and for providing the feedback signal indicative of the magnitude of the second voltage.

BRIEF DESCRIPTION OF THE DRAWINGS

The invention will now be described in more detail with reference to the accompanying drawings, wherein likeparts in each of the several figures are identified by the same reference characters, and wherein.

DETAILED DESCRIPTION

Figure 1:
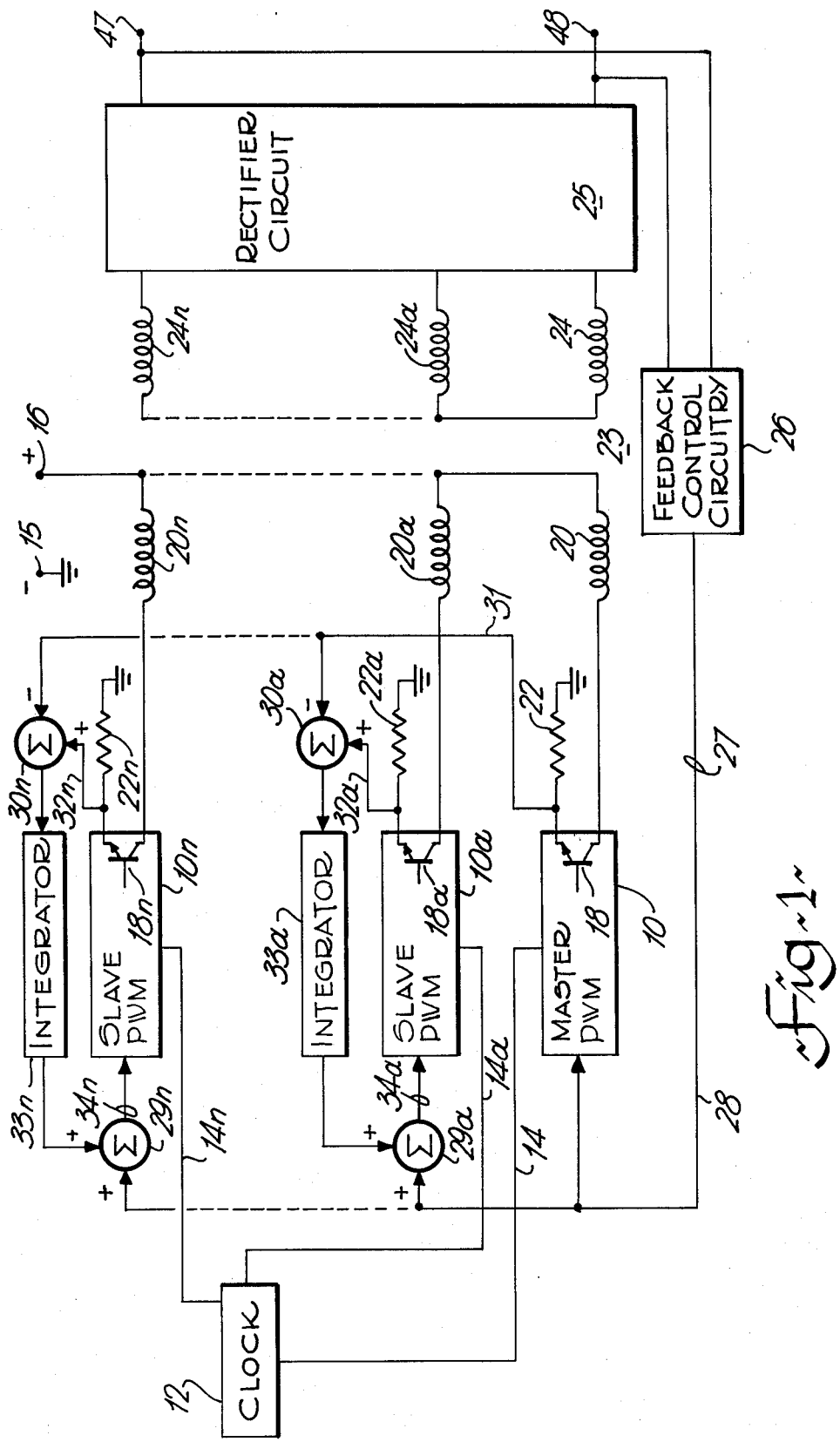
FIG. 1 is a simplified block diagram of the present invention.

FIG. 1 is a simplified block diagram of the present invention. It comprises a master pulse width modulator (PWM) 10 and n slave pulse width modulators (PWM) indicated as 10a through 10n inclusive. A clock 12 provides a train of rectangular pulses on each of n+1 lines (or conductors), with the pulse on line 14 being applied to master PWM 10 and the pulses on lines 14a through 14n being applied to slave PWM's 10a through 10n, respectively. Clock 12 functions so that there is only one pulse on any of the lines 14 through 14n inclusive at any given time.

As with any pulse width modulated power regulator, the purpose of the master PWM 10 and the slave PWM's 10a to 10n is to interrupt the input DC voltage. The input DC voltage is applied to terminals 15 and 16, with the positive being applied to terminal 16. Master PWM 10 and each slave PWM 10a to 10n contains a switching transistor 18 to 18n respectively. Terminal 16 is connected to the collectors of each of the transistors 18 to 18n via windings 20 to 20n, respectively. The emitters of each of the transistors are connected to the negative terminal 15 via resistors 22 to 22n respectively. Resistors 22 to 22n are very low in value, having a resistance of approximately one ohm each; they are used as sensing resistors. It should also be noted that the windings 20 through 20n form a primary winding for a transformer 23. The windings 20 to 20n can be considered as an n+1 phase primary winding, wye connected. The secondary of transformer 23 is comprised of n+1 windings indicated by the reference numerals 24 through 24n. The windings 24 to 24n can be considered as an n+1 phase secondary winding, wye connected. A rectifier circuit 25 is connected to the windings 24 through 24n to produce a regulated DC output voltage on terminals 47 and 48. If desired, a smaller number of secondary windings 24 to 24n can be used and also, if desired, a larger number of output voltages can be obtained from rectifier 25 than shown.

Feedback control circuitry 26 monitors the DC output voltage of rectifier 25 and produces a feedback control signal 27 on line 28. Signal 27 is fed to master PWM 10 and, via summing circuits 29a through 29n, to slave PWM's 10a through 10n respectively. The current being passed by transistors 18 of master PWM 10 flows through resistor 22 and the magnitude of the voltage drop across resistor 22 is indicative of the magnitude of the current passing through resistor 22 and consequently through transistor 18. This voltage drop is applied to summing circuits 30a through 30n via line 31. The remaining inputs of each of the summing circuits 30a through 30n are fed with the voltages developed across resistors 22a through 22n respectively as appear on lines 32a through 32n respectively. The summing circuits 30a through 30n sum the signals appearing at their respective inputs algebraically, according to the signs shown in the figure. It should be noted that the signals appearing at the respective inputs of summing circuits 30a to 30n do not appear simultaneously, but rather appear sequentially. In other words, when line 31 is carrying a pulse signal, lines 32a to 32n are at zero potential; similarly, when line 32a is carrying a pulse signal, line 31 and lines 32b to 32n are at zero potential, etc. The output of each summing circuit 30a through 30n is applied to an integrator 33a through 33n respectively. The output of each integrator 33a to 33n alternates about a median value since the input of each integrator 33a to 33n consists of a series of rectangular pulses of approximately the same magnitude and duration, and of alternating polarity. The output of each integrator 33a through 33n is in turn applied to summing circuits 29a through 29n respectively. The summing circuits 29a through 29n sum the signals appearing at their inputs algebraically, according to the signs shown in the figure. The output of each summing circuit 29a through 29n is applied to slave PWM 10a through 10n respectively, for control purposes. The output signal of each summing circuit 29a through 29n is indicated by the reference characters 34a through 34n respectively. The signals 34a through 34n are employed to modify the length of time that each transistor 18a through 18n respectively, is turned on in response to the pulses from clock 12.

Figure 2:
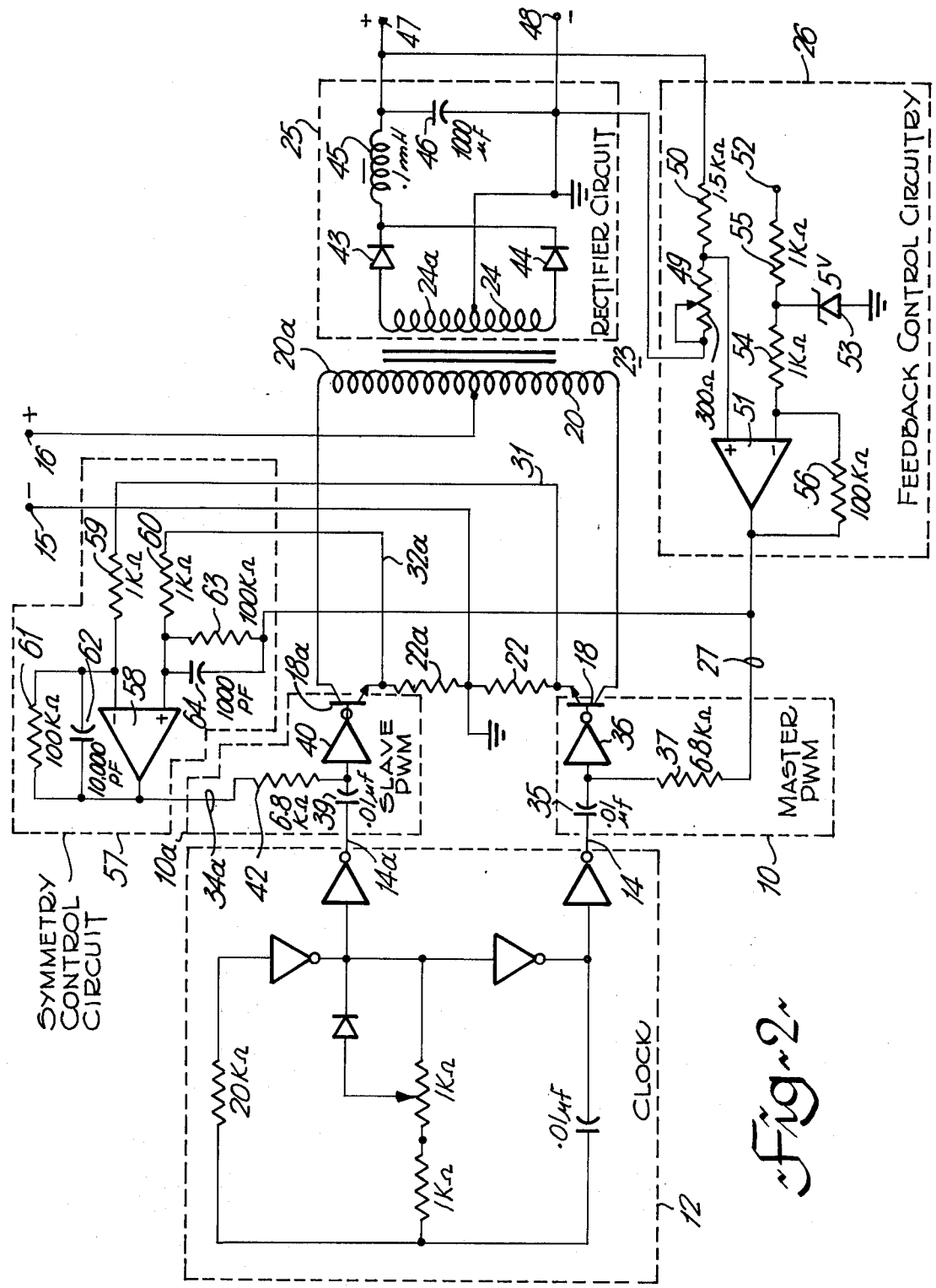
FIG. 2 is a simplified schematic diagram of one particular embodiment of the present invention.

FIG. 2 is a schematic of a circuit constructed according to the block diagram of FIG. 1, wherein n=1 (i.e. there is only one slave PWM). Clock circuit 12 is of conventional design and produces a first train of rectangular pulses (negative going) on line 14 and a second train of rectangular pulses (negative going) on line 14a; the pulses on each line 14 and 14a having a duty cycle of 50% and the pulses on line 14 being 180° out of phase with the pulses on line 14a. The frequency of the pulses is 20 KHz.

The pulses on line 14 are applied to capacitor 35 of master PWM 10. The other end of capacitor 35 is connected to inverter 36 which is in turn connected to the base of transistor 18. Since line 14 applies a train of rectangular pulses to capacitor 35, the output of capacitor 35, applied to the input of inverter 36, has a decaying exponential waveform. Inverter 36 transforms this decaying exponential waveform into a rectangular wave, and of course inverts its polarity. A feedback control signal 27 from the output of feedback control circuitry 26 is applied to the input of inverter 36 via resistor 37. The effect of feedback control signal 27 is to set a "base" level for inverter 36 and thus aid in controlling the duty cycle of the rectangular wave produced by inverter 36, and consequently control the amount of time that transistor 18 is conducting current. Signal 27 will be described later, in more detail.

The input voltage which is to be regulated is applied to terminals 15 and 16, with terminal 16 having positive polarity. Terminal 16 is connected to the junction of the two windings 20 and 20a. When transistor 18 is conducting (i.e. turned on) current flows from terminal 16 through winding 20 to the collector of transistor 18, from the emitter of transistor 18 through resistor 22 and thence to terminal 15.

Slave PWM 10a operates in a similar fashion. Line 14a applies a train of rectangular pulses to capacitor 39 of slave PWM 10a. The other end of capacitor 39 is connected to the input of inverter 40 which is in turn connected to the base of transistor 18a. Line 14a applies a train of rectangular pulses to capacitor 39, and the output of capacitor 39, applied to the input of inverter 40, has a decaying exponential waveform. Inverter 40 transforms this decaying exponential waveform into a rectangular wave, and inverts its polarity. An output control signal 34a is applied to the input of inverter 40 via resistor 42. The function of control signal 34a is to set a "base" level for inverter 40 and thus aid in controlling the duty cycle of the rectangular wave produced by inverter 40, and consequently control the amount of time that transistor 18a is conducting current. The derivation of control signal 34a will be discussed later, in more detail.

Transistor 18a of slave PWM 10a functions in a manner similar to transistor 18 of master PWM 10. When transistor 18a of slave PWM 10 is turned on, current flows from terminal 16, through winding 20a, through transistor 18a, through resistor 22a and finally to terminal 15.

The effect of current alternately flowing and not flowing in windings 20 and 20a induces voltages in windings 24 and 24a, of transformer 23. This voltage is rectified by diodes 43 and 44 as shown in the figure. An inductor 45 and a capacitor 46 provide filtering to smooth the regulated DC output which is provided at output terminals 47 and 48, with terminal 47 being of positive polarity.

Feedback control circuitry 26 senses the voltage across terminals 47 and 48 and provides a feedback control signal 27 which is applied to the input of inverter 36 via resistor 37. As mentioned previously, signal 27 provides a "base" level for inverter 36. Providing a base level for inverter 36 means that the magnitude of the signal required from capacitor 35 for changing the output of inverter 36 is variable; i.e. the threshold voltage for inverter 36 is effectively adjustable. This results in adjusting the duty cycle of the rectangular wave produced by inverter 36 and thereby adjusting the "on" time of transistor 18. This provides a feedback control function by adjusting the duty cycle of master PWM 10.

The desired magnitude of the output voltage across the terminals 47 and 48 is adjusted by varying the value of rheostat 49 which, in series with resistor 50, is connected across terminals 47 and 48 as shown in FIG. 2. Rheostat 49 and resistor 50 form a voltage divider, the output of which is applied to the non-inverting (+) input of operational amplifier 51. A voltage of approximately +30 volts is applied to terminal 52. Zener diode 53 is employed with resistors 54 and 55 to provide a regulated reference input voltage to the inverting (−) input of operational amplifier 51. Resistor 56 is a feedback resistor for amplifier 51, connected as shown in the figure.

Symmetry control circuit 57 of FIG. 2 incorporates the functions performed in FIG. 1 by summing circuit 30a, integrator 33a, and summing circuit 29a. It can be seen that circuit 57 senses the current passed by master PWM 10 by sensing the voltage drop across resistor 22; this voltage drop is applied to the inverting (−) input of operational amplifier 58 via line 31 and resistor 59. Circuit 57 also senses the current passed by slave PWM 10a by sensing the voltage drop across resistor 22a; this voltage drop is applied to the non-inverting (+) input of operational amplifier 58 via line 32a and resistor 60. The integration function of circuit 57 is provided by resistor 61 and capacitor 62 connected in parallel between the output of operational amplifier 58 and its inverting (−) input, as is well known in the art. The operation of summing the integrated output with the feedback control signal 27 (i.e. summing circuit 29a of FIG. 1) is performed in FIG. 2 by referencing the non-inverting (+) input of operational amplifier 58 to the output (i.e. signal 27) of operational amplifier 51 via the parallel connection of resistor 63 and capacitor 64. Output signal 34a is applied to the input of inverter 40 via resistor 42.

The purpose of signal 34a is to provide a "base" level for inverter 40. Setting a "base" level for inverter 40 controls the point at which inverter 40 changes its output state (between a logic 0 and a logic 1) and consequently controls how long transistor 18a conducts current; i.e. the threshold voltage for inverter 40 is effectively adjustable. If, for example, transistor 18 of PWM 10 is conducting for a longer period of time than is transistor 18a of PWM 10a, then the pulse signal on line 31 applied to the inverting (−) input of amplifier 58 will last longer then the pulse signal (on line 32a) applied to the non-inverting (+) input of amplifier 58 and (assuming equal magnitudes of the two aforementioned pulse signals) the output signal 34a of amplifier 58 will consequently increase in a negative direction. This results in an increased negative bias on inverter 40, and consequently inverter 40 produces a longer positive pulse on its output, thereby causing transistor 18a to conduct current for a longer period of time. Similarly, if transistor 18 of PWM 10 is conducting for a shorter period of time then is transistor 18a of PWM 10a, then the pulse signal on line 31 applied to the inverting (−) input of amplifier 58 will be of less duration than the pulse signal applied to the non-inverting (+) input of amplifier 58 and (still assuming equal magnitudes of the two aforementioned pulse signals) the output signal 34a of amplifier 58 will consequently increase in a positive direction. This results in a decreased negative bias on inverter 40, and consequently inverter 40 produces a shorter positive pulse on its output, thereby causing transistor 18a to conduct current for a shorter period of time, than it was previously.

In the general case (i.e. when the magnitude of the current pulses passed by transistors 18 and 18a and consequently the pulse signals on lines 31 and 32a, are not necessarily of equal magnitude) it is desired to ensure that the project of the current (I) and the duration of conduction (t), of transistor 18, is the same as the product of the same parameters for transistor 18a (i.e. Ixt for transistor 18 is the same as Ixt for transistor 18a). Expressed in other words, it is desired that the charge (Ixt) passed by transistor 18 is the same as the charge (Ixt) passed by transistor 18a.

Figure 3:
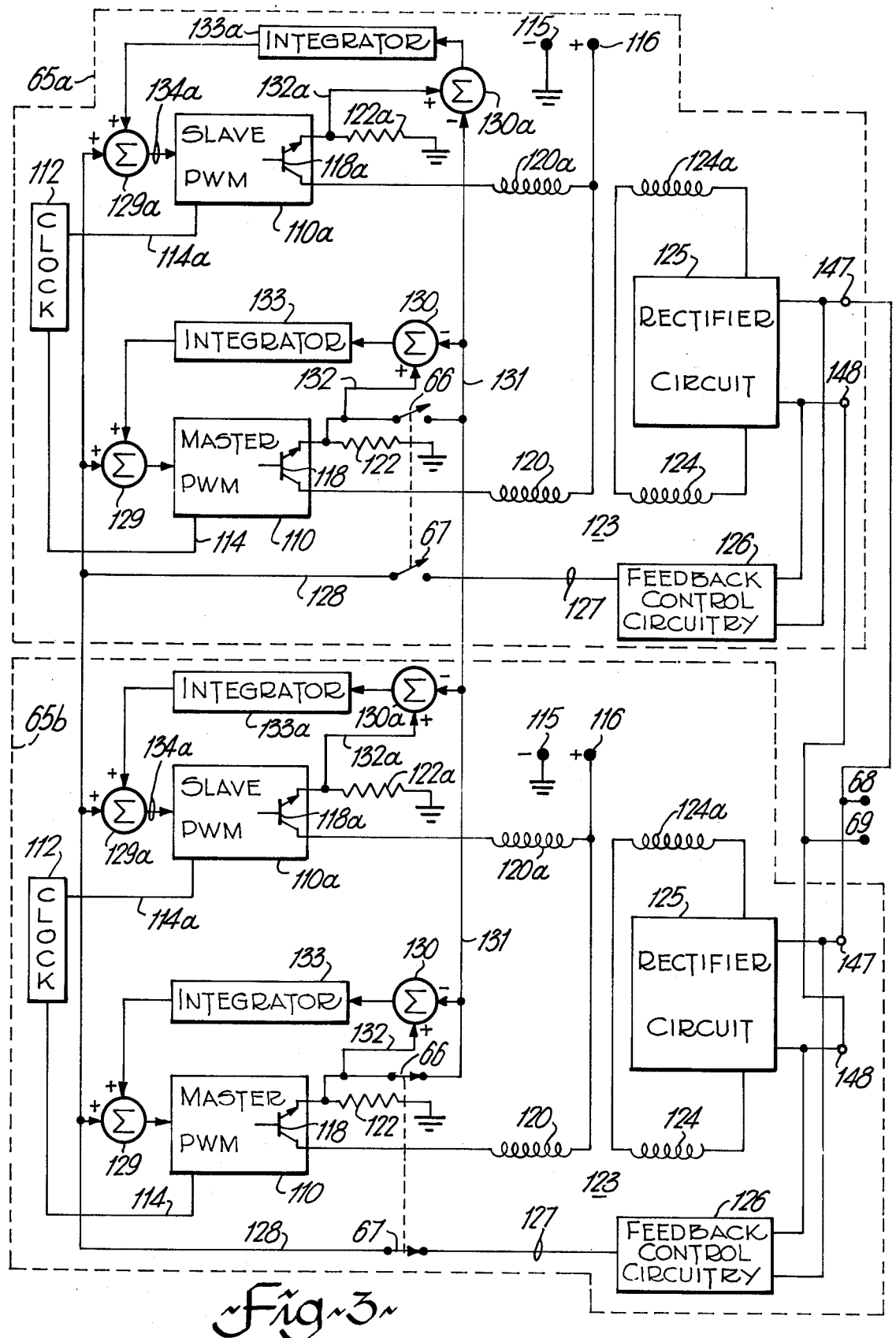
FIG. 3 is a simplified block diagram depicting two power converters (according to the preferred embodiment of the present invention) connected for parallel operation.

FIG. 3 depicts two converter circuits 65a and 65b constructed according to a preferred embodiment of the present invention, shown in simplified block diagram form, and shown interconnected for parallel operation. Converter circuits 65a and 65b are identical to one another, and they are very similar to the circuit shown in FIGS. 1 and 2. Because of this similarity, components of circuits 65a and 65b have been assigned a reference character exactly one hundred (100) higher than the analogous component in FIG. 1. For example, clock 12 of FIG. 1 is depicted as clock 112 in converter circuit 65a of FIG. 3, and slave PWM 10a of FIG. 1 is depicted as slave PWM 110a of FIG. 3. Converter circuits 65a and 65b function in an analogous manner to the circuit of FIG. 1.

The differences between circuit 65a (and 65b) of FIG. 3 and the circuit of FIG. 1 are as follows. The circuit of FIG. 1 is shown for the general case of one master PWM 10 and n slave PWM's indicated as 10a through 10n; circuit 65a of FIG. 3 is shown for the specific case of one master PWM 110 and only one slave PWM 110a. Circuit 65a of FIG. 3 includes additional circuitry employed with master PWM 110 to enable PWM 110 to act as a slave PWM when circuit 65a is employed in parallel operation with one or more additional power supplies (e.g. with circuit 65b as depicted in FIG. 3). The additional circuitry employed with master PWM 110 includes line 132, summing circuit 130, integrator 133, summing circuit 129 and two single pole single throw (SPST) switches 66 and 67 (interconnected to operate in unison), all as shown and as interconnected in FIG. 3.

Switches 66 and 67 function to change master PWM from functioning as a "Master" unit to functioning as a "slave" unit. When switches 66 and 67 are in the open position, as in circuit 65a of FIG. 3, master PWM 110 functions in the same manner as does slave PWM 110a (or as does slave PWM 10a of FIG. 1). When switches 66 and 67 are in the closed position, as in circuit 65b of FIG. 3, master PWM 110 functions in the same manner as does master PWM 10 of FIG. 1. It should be noted that the only difference between circuits 65a and 65b is the position of the switches 66 and 67. If additional converter circuits (identical to circuits 65a and 65b) were connected in parallel with converter circuits 65a and 65b, the additional converter circuits would have their switches 66 and 67 in the open position so that PWM 110 of circuit 65b is the only master PWM operating as a "Master" unit in the combination. It should also be noted that the output terminals 147 and 148 of circuits 65a and 65b are connected in parallel to provide power to terminals 68 and 69; the input terminals 115 and 116 of each circuit 65a and 65b are also connected in parallel, but have not been so shown in FIG. 3 so as to avoid undue cluttering of the figure. Additionally, when circuits 65a and 65b are connected in parallel, line 128 of circuit 65a is connected to line 128 of circuit 65b, and line 131 of circuit 65a is connected to line 131 of circuit 65b.

What is claimed is:

1. A pulse width modulation converter circuit for transforming a first DC voltage into a second voltage, wherein the magnitude of said second voltage is regulated by said converter circuit, said converter circuit comprising:

a clock means for providing a symmetrical train of pulses on each of n+1 conductors, wherein only one pulse occurs on any one of said conductors at any given instant in time, and wherein n is a positive integer equal to, or greater than, 1;

a master pulse width modulator means responsive both to the train of pulses on one of said n+1 conductors and to a feedback signal indicative of the magnitude of said second voltage, said master pulse width modulator means controlling the flow of current, due to said first DC voltage, through a portion of a transformer primary winding;

n slave pulse width modulator means, each said slave pulse width modulator means being responsive both to the train of pulses on one of said n+1 conductors, in a one-to-one relationship, and to an output control signal based both upon said feedback signal, indicative of the magnitude of said second voltage, and upon the difference in the magnitude of the charge passed by said master pulse width modulator means and the charge passed by said respective slave pulse width modulator means, each said slave pulse width modulator means controlling the flow of current, due to said first DC voltage, through a portion of said transformer primary winding.

2. The pulse width modulation converter circuit of claim 1 wherein n=1.

3. A pulse width modulation converter circuit for transforming a first DC voltage into a second voltage, wherein the magnitude of said second voltage is regulated by said converter circuit, said converter circuit comprising:

a clock means for providing a symmetrical train of rectangular pulses on each of n+1 conductors, wherein only one pulse occurs on any one of said conductors at any given instant in time, and wherein n is a positive integer equal to, or greater than, 1;

a master pulse width modulator means responsive both to the train of pulses on one of said n+1 conductors and to a feedback signal indicative of the magnitude of said second voltage, said master pulse width modulator means controlling the flow of current, due to said first DC voltage, through a portion of a transformer primary winding;

n slave pulse width modulator means, each said slave pulse width modulator means being responsive both to the train of pulses on one of said n+1 conductors, in a one-to-one relationship, and to an output control signal, said output control signal being based both upon said feedback signal indicative of the magnitude of said second voltage, and upon the difference in the magnitude of the charge passed by said master pulse width modulator means and the charge passed by said respective slave pulse width modulator means, each said slave pulse width modulator means controlling the flow of current, due to said first DC voltage, through a separate and distinct portion of the transformer primary winding;

a rectifier means connected to the secondary winding of said transformer for rectifying the resultant voltage appearing across said secondary winding, thereby producing said second voltage;

a control circuitry means for monitoring said second voltage and for providing said feedback signal indicative of the magnitude of said second voltage.

4. The pulse width modulator converter circuit of claim 3, wherein said output control signal is produced as follows: the first algebraic sum of (1) the negative of a signal indicative of the magnitude of the current being passed by said master pulse width modulator means and (2) a signal indicative of the magnitude of the current being passed by the slave pulse width modulator means being controlled is taken; said first algebraic sum is integrated, with respect to time; the second algebraic sum of (1) the resultant integration of said first algebraic sum and (2) a signal indicative of the magnitude of said second voltage is taken, and said second algebraic sum is said output control signal.

5. The pulse width modulator converter circuit of claim 4, wherein said transformer has an $n+1$ phase primary winding, wye connected, and an $n+1$ phase secondary winding, wye connected.

6. The pulse width modulator converter circuit of claim 3 wherein $n=1$.

7. The pulse width modulator converter circuit of claim 4 wherein $n=1$.

8. The pulse width modulator converter circuit of claim 5 wherein $n=1$.

9. A pulse width modulation converter circuit for transforming a first DC voltage into a second voltage, wherein the magnitude of said second voltage is regulated by said converter circuit, said converter circuit comprising:

a clock means for providing a first symmetrical train of rectangular pulses on a first conductor, and a second symmetrical train of rectangular pulses on a second conductor, said second train of pulses being 180 degrees out of phase with said first train of pulses;

a master pulse width modulator means responsive both to said first train of pulses and to a feedback signal indicative of the magnitude of said second voltage, said master pulse width modulator means controlling the flow of current, due to said first DC voltage, through a first portion of a transformer primary winding;

one slave pulse width modulator means responsive both to said second train of pulses and to an output control signal based both upon said feedback signal indicative of the magnitude of said second voltage, and upon the difference in the magnitude of the charge passed by said master pulse width modulator means and by said slave pulse width modulator means, said slave pulse width modulator means controlling the flow of current, due to said first DC voltage, through a second portion of said transformer primary winding.

10. The pulse width modulation converter circuit of claim 9 further including a rectifier means connected to the secondary winding of said transformer for rectifying the resultant voltage appearing across said secondary winding, thereby producing a second DC voltage; and feedback control circuitry means for monitoring said second DC voltage and for providing said feedback signal indicative of the magnitude of said second DC voltage.

11. The pulse width modulation converter circuit of claim 10, wherein said output control signal is produced as follows: the first algebraic sum of (1) the negative of a signal indicative of the magnitude of the current being passed by said master pulse width modulator means and (2) a signal indicative of the magnitude of the current being passed by the slave pulse width modulator means is taken;

the second algebraic sum of (1) the resultant integration of said first algebraic sum and (2) a signal indicative of the magnitude of said second DC voltage is taken, and the resultant signal so produced is said output control signal.

12. The pulse width modulation converter circuit of claim 9 wherein said master pulse width modulator means is identical in construction to said slave pulse width modulator means.

13. The pulse width modulation converter circuit of claim 10 wherein said master pulse width modulator means is identical in construction to said slave pulse width modulator means.

14. The pulse width modulation converter circuit of claim 11 wherein said master pulse width modulator means is identical in construction to said slave pulse width modulator means.

15. The pulse width modulation converter circuit of claim 10 wherein said converter circuit is operated in parallel with the outputs of one or more additional converter circuits wherein said additional converter circuits are substantially identical to said converter circuit of claim 10 with the exception that said additional converter circuits have their master pulse width modulators connected and operated as slave pulse width modulators and their feedback control circuitry means are disabled; said modulator converter circuit of claim 10 provides the master pulse width modulator function, and the feedback control circuitry function, for all said converter circuits connected in parallel.

* * * * *